US006782473B1

(12) United States Patent
Park

(10) Patent No.: US 6,782,473 B1
(45) Date of Patent: Aug. 24, 2004

(54) NETWORK ENCRYPTION SYSTEM

(75) Inventor: Min Soo Park, Kunpo-si (KR)

(73) Assignee: LG Information & Communications, Ltd., Seoul (KR)

(*) Notice: Subject to any disclaimer, the term of this patent is extended or adjusted under 35 U.S.C. 154(b) by 0 days.

(21) Appl. No.: 09/353,931

(22) Filed: Jul. 15, 1999

(30) Foreign Application Priority Data

Nov. 3, 1998 (KR) ............................................. 98-47020

(51) Int. Cl.[7] .......................... H04L 9/08; G06F 12/14; H03M 13/00
(52) U.S. Cl. ....................... 713/160; 713/161; 713/200; 713/201
(58) Field of Search ................................. 713/160, 161, 713/200, 201, 189, 193, 153; 380/37, 44, 277, 247, 216, 1, 46

(56) References Cited

U.S. PATENT DOCUMENTS 6,058,476 A * 5/2000 Matsuzaki et al. .......... 713/169
6,252,961 B1 * 6/2001 Hogan .......................... 380/37
6,504,930 B2 * 1/2003 Enari ........................... 380/37

* cited by examiner

Primary Examiner—Ly V. Hua
(74) Attorney, Agent, or Firm—McKenna Long & Aldridge LLP

(57) ABSTRACT

The present invention relates to a network encryption system and method, and particularly, to a network encryption system and method involving the encryption and/or decryption of user data using random number generation. Even more particularly, the present invention relates to encryption and/or decryption of user data using random numbers that are generated using a portion of the user data discriminated from the data frame or the data packet.

24 Claims, 5 Drawing Sheets

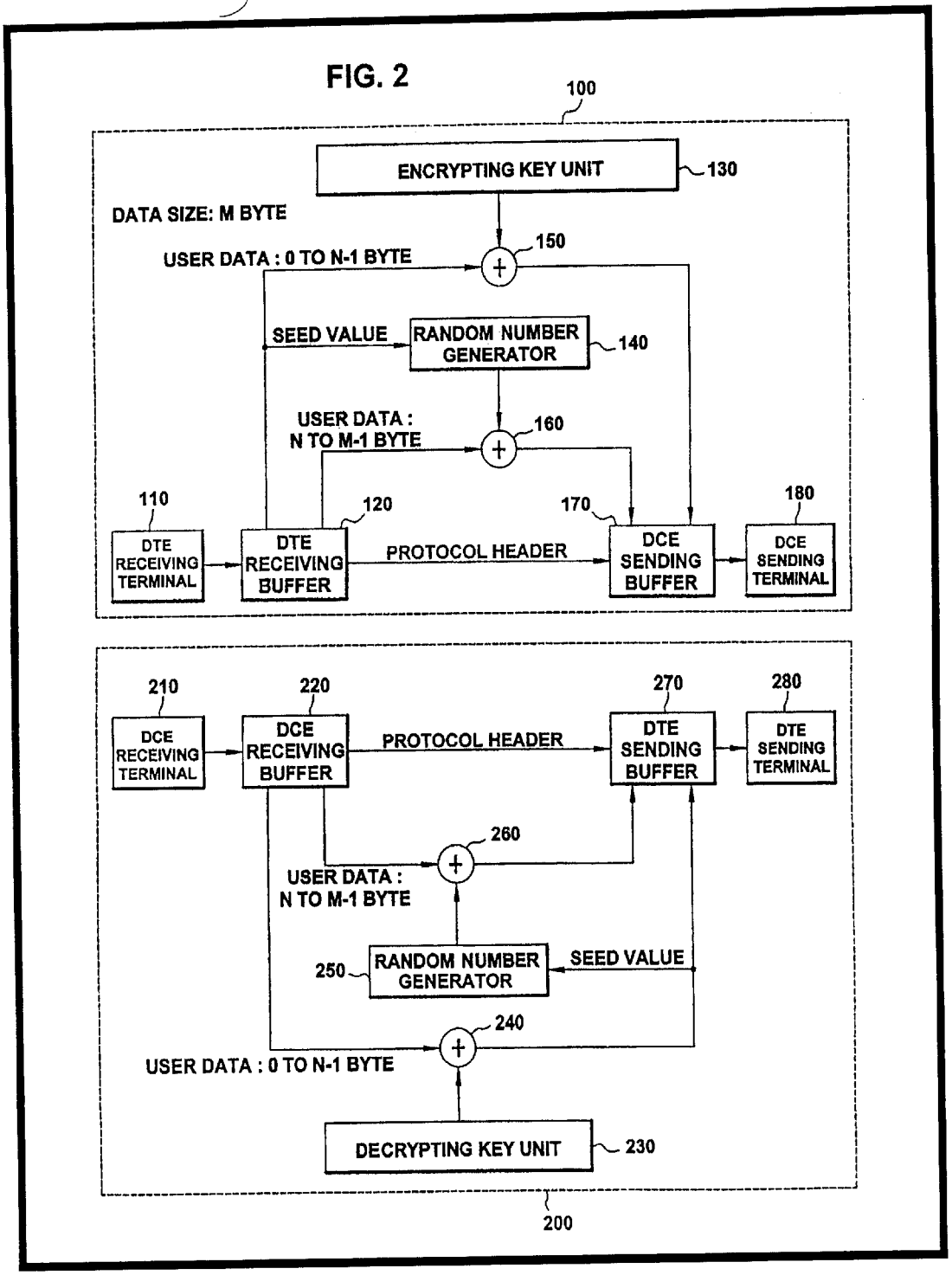

NETWORK ENCRYPTION SYSTEM

BACKGROUND

1. Technical Field

The present invention relates to a network encryption system, and particularly to a network encryption system for encrypting or decrypting user data at every data frame or data packet by using a general random number generator in different ways.

2. Background

Generally, a network encryption apparatus uses a block encryption algorithm like a DES(Data Encryption Standard) in US because a data packet or a data frame requiring a limited data size is inputted as a unit.

A block encryption algorithm is an encryption method for making it impossible to decrypt data having a fixed length by changing the data with use of an encrypting key according to predetermined rules and tables. For decrypting the data, the predetermined rules and the tables are used inversely by using the decrypting key. Accordingly, the block encryption algorithm is suitable for encrypting the data having a fixed length discontinuously and repeatedly.

But, because it is difficult to design the block encryption algorithm, the number of the verified algorithm is limited. Actually, the algorithm for export has a low security level and it is exported to other countries except US. That's why the other countries except US may not encrypt information to such a desired level because of having a lower security level than US's even though having the encryption apparatus.

FIG. 1A shows a flowchart indicating an encryption method of a network encryption apparatus using a conventional block encryption algorithm. FIG. 1B shows a flowchart indicating a decryption method of a network encryption apparatus using a conventional block decryption algorithm.

Referring to FIGS. 1A and 1B, the network encryption apparatus using a conventional block encryption/or decryption algorithm divides a received data frame or a data packet into 64 bit units, in case of using a 64 bit-block encryption/or decryption algorithm. And then, the apparatus encrypts or decrypts the divided data through encryption/or decryption algorithm by using a predetermined 64 bit-encrypting/or decrypting key, respectively.

In case that the data frame or the data packet is shorter than 64 bits, encryption is processed after inserting "0" as many as required to make 64 bits. And the decryption is processed after erasing "0" as many as inserted during encrypting. Consequently, the data size before encryption is the same as one after decryption.

The network encryption apparatus using the conventional block encryption algorithm is operated as described below. After receiving the data frame or the data packet from a DTE(Data Terminal Equipment) receiving terminal, the data frame or the data packet is stored in the DTE receiving buffer. A protocol header of the data frame or the data packet stored in the DTE receiving buffer is copied in the DCE (Data Circuit-terminating Equipment) sending buffer.

And then, user data of the data frame or the data packet stored in the DTE receiving buffer is block-encrypted by using a 64 bit-encrypting key into every 64 bits. In case that it is shorter than 64 bits, the data frame or the data packet is block-encrypted after inserting "0", so called Zero Padding, as many as required to make 64 bits. And the block-encrypted 64 bit encrypting data is stored in the DCE sending buffer. The data frame or the data packet stored in the DCE sending buffer is sent to a DCE sending terminal.

Contrarily, for decrypting data the data frame or the data packet is stored in the DCE receiving buffer after receiving the data frame or the data packet from the DCE receiving terminal. And then a protocol header of the data frame or the data packet stored in the DCE receiving buffer is copied in the DTE sending buffer.

And user data of the data frame or the data packet stored in the DCE receiving buffer is block-decrypted by using the 64 bit-decrypting key into every 64 bits. The block-decrypted, 64 bit data is stored in the DTE sending buffer. The inserted "0" is erased in case that the data frame or the data packet is shorter than 64 bits. Therefore, the data is stored in the DTE sending buffer by being made into 64 bit-data frame or packet.

The data having a fixed length is encrypted/and decrypted in encryption and decryption method of the network encryption apparatus using the conventional block encryption/and decryption algorithm. Therefore, it should have zero padding process in case that the data size is smaller than the block size and padded, "0" should be erased after decryption.

In addition, hardware elements employing the block encryption algorithm are supplied with a lowered security level because of exporting limitation of US, and it is difficult to verify the security level with the block algorithm.

SUMMARY

Accordingly, in order to solve the problems in the prior art it is an object of the present invention to provide network encryption system, particularly, for encrypting or decrypting user data at every data frame or data packet by using a general random number generator in different ways.

One embodiment to achieve above object is to provide a network encryption apparatus, comprising encrypting means for generating random numbers by using a part of user data discriminated from data frame or data packet and encrypting the user data by logical operation with the random numbers, and decrypting means for generating random numbers by using a part of decrypted user data and decrypting the user data by logical operation with random numbers.

Another embodiment to achieve above object is to provide a network encryption apparatus, comprising encrypting means for generating random numbers at every data frame or data packet by using a part of user data discriminated from the data frame or the data packet and encrypting the user data by logical operation of the part of the user data with the random numbers, and of remaining part of the user data with an encrypting key having a fixed length, and decrypting means for decrypting part of user data discriminated from the data frame or the data packet by logical operation with a decrypting key having a fixed length, generating random numbers by using the part of the decrypted user data and decrypting the user data by logical operation with the random numbers.

The other embodiment to achieve above object is to provide a network encryption method, comprising encrypting process of generating random numbers by using a part of user data discriminated from data frame or data packet and encrypting the user data by logical operation with the random numbers, and decrypting process of generating random numbers by using a part of decrypted user data and decrypting the user data by logical operation with the random numbers.

BRIEF DESCRIPTION

Other objects, features and advantages of the present invention will become more apparent from the following detailed description when read in conjunction with the accompanying drawings, in which:

FIG. 2 shows a block diagram indicating a network encryption apparatus according to the present invention.

DETAILED DESCRIPTION OF THE PREFERRED EMBODIMENTS

Figure 1A:
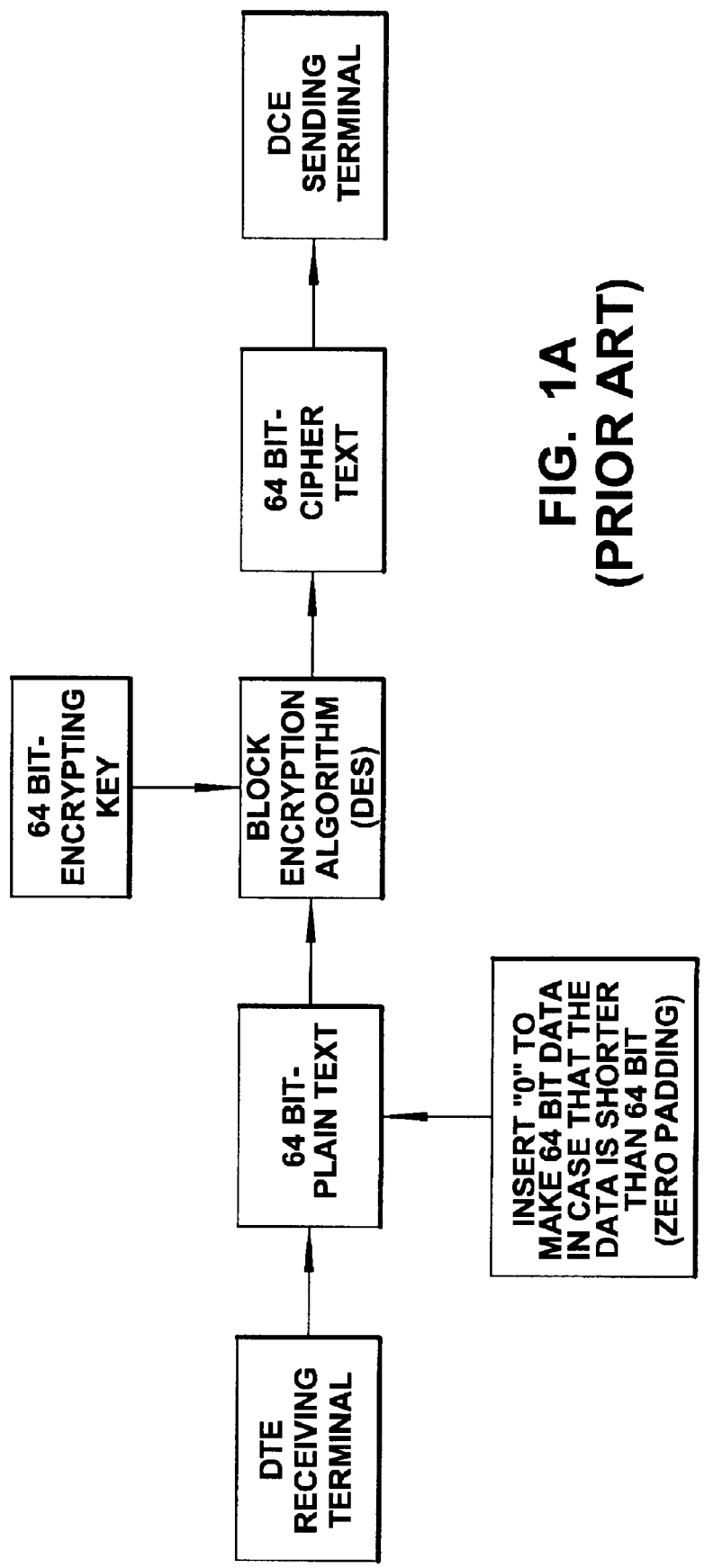
FIG. 1A shows a flowchart indicating an encryption method of a network encryption apparatus using a conventional block encryption algorithm.
Figure 1B:
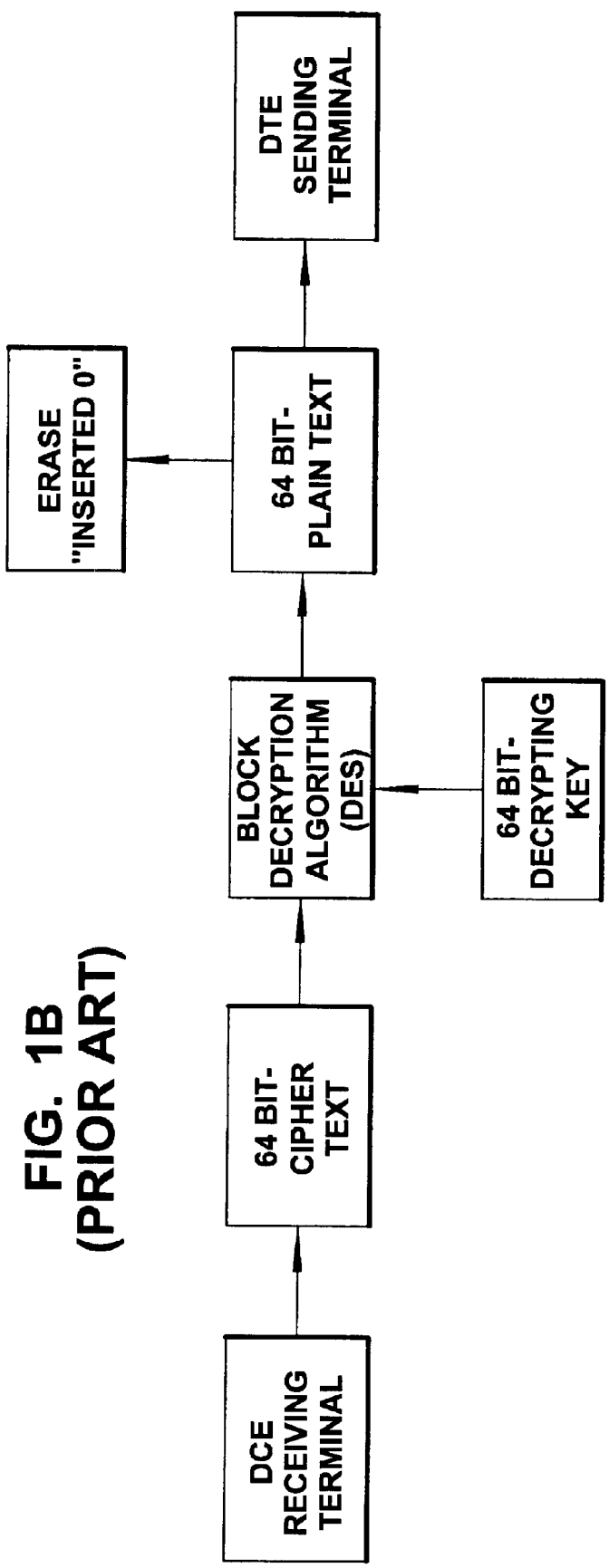
FIG. 1B shows a flowchart indicating a decryption method of the network encryption apparatus using a conventional block decryption algorithm.

Embodiments of the invention will be described with reference to the accompanying drawings.

FIG. 2 shows a block diagram indicating the network encryption apparatus according to the present invention.

Referring to FIG. 2, the network encryption apparatus according to the present invention includes an encryption unit 100 and a decryption unit 200. The encryption unit 100 generates random numbers by using a part of user data discriminated from the data frame or the data packet. And the encryption unit 100 encrypts the part of user data by logical operation with the random numbers and remaining part of the user data with an encrypting key having a predetermined length, respectively. The decryption unit 200 decrypts a part of the user data discriminated from the data frame or the data packet by logical operation with a decrypting key. And the decrypting unit 200 generates random numbers using the part of the decrypted user data, and carries out logical operation of the random numbers and the user data.

The encryption unit 100 includes a DTE receiving buffer 120 for discriminating protocol data and user data from the data frame or the data packet, respectively, and dividing first N bytes from the user data, and an encrypting key unit 130 for storing N byte-encrypting key. And the encryption unit 100 includes a random number generator 140 for generating (M−N+1) byte-random numbers by using the first N byte of the user data, a first logical operating unit 150 for encrypting the first N byte of the user data by logical operation with the encrypting key. And the encryption unit 100 includes a second logical operating unit 160 for encrypting remaining user data with the random numbers, and a DCE sending buffer 170 for generating the data frame or the data packet by coupling protocol data with the encrypted user data.

The decryption unit 200 includes a DCE receiving buffer 220 for discriminating protocol data and user data from the data frame or the data packet, respectively, and dividing first N bytes from the user data, and a decrypting key unit 230 of storing an N byte-decrypting key. And the decryption unit 200 includes a first logical operating unit 240 for decrypting the first N byte of the user data by logical operation with the decrypting key, and a random number generator 250 for generating (M−N+1) byte-random numbers by using the N byte of the decrypted user data. And the decryption unit 200 includes a second logical operator 260 for decrypting remaining part of the user data by logical operation with the random numbers, and a DTE sending buffer 270 for generating the data frame and the data packet by coupling protocol data with the decrypted user data.

Figure 3A:
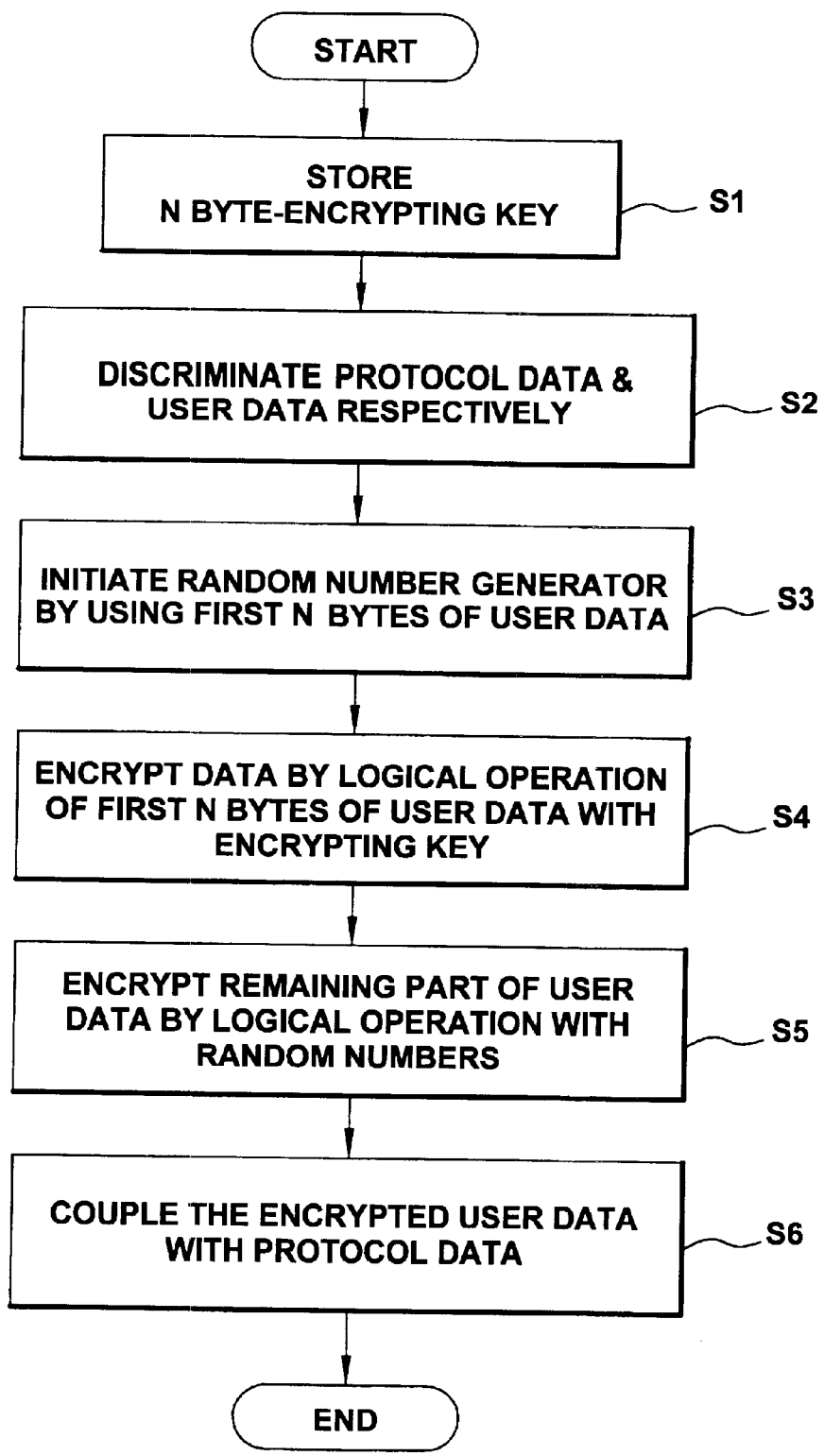
FIG. 3A shows a flowchart indicating encrypting steps in the network encryption method according to the present invention.
Figure 3B:
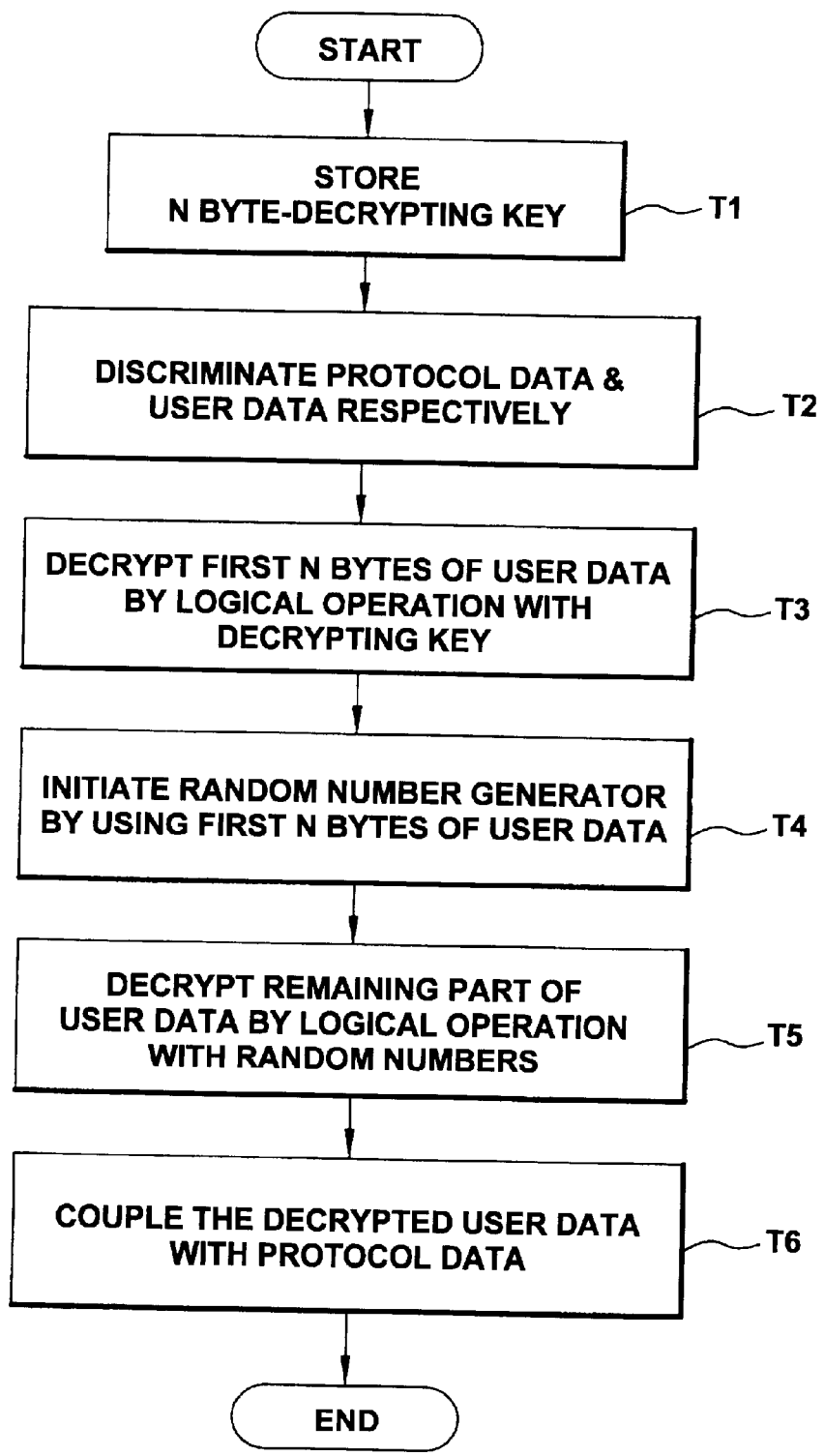
FIG. 3B shows a flowchart indicating decrypting steps in the network decryption method according to the present invention.

FIG. 3A shows a flowchart indicating encrypting steps in the network encryption method according to the present invention. FIG. 3B shows a flowchart indicating decrypting steps in the network decryption method according to the present invention.

Referring to FIGS. 3A and 3B, network encryption method according to the present invention includes processes of generating random numbers by using a part of user data and encrypted or decrypted user data at every data frame or data packet according to the random numbers in different ways.

The encryption of the user data includes the steps of storing an encrypting key having a fixed length(S1), discriminating protocol data and user data from data frame or data packet, respectively and dividing first N bytes from the user data(S2), generating (M−N+1) byte-random numbers by using the first N byte of the user data in which the random numbers are different from each data frame or data packet (S3), first encrypting the first N byte of the user data by logical operation with the encrypting key(S4), second encrypting remaining part of the user data by logical operation with the random numbers(S5) and generating data frame or data packet by coupling protocol data with the encrypted user data(S6).

The decrypting processes of the user data include the steps of storing a decrypting key having N bytes(T1), discriminating protocol data and user data from data frame or data packet, respectively and dividing first N bytes from the user data(T2), first decrypting the first N byte of the user data by logical operation with the decrypting key(T3), generating (M−N+1) byte-random numbers by using the decrypted data in the step T1(T4), second decrypting the remaining part of the user data by logical operation with the random number(T5) and generating data frame or data packet by coupling protocol data with the decrypted user data(T6).

Now operation of the network encryption apparatus according to the present invention will be explained in detail hereinafter. And it will be explained with a case that a first N byte of the user data is used for initiating the random number generator.

The encryption process of the encryption unit 100 is first described.

The data frame or the data packet received from the DTE receiving terminal 110 is stored in the DTE receiving buffer 120. When storing the data frame or the data packet, a tag field which discriminates protocol part and user data from the data frame or the data packet, respectively, is generated and stored on the DTE receiving buffer 120. And the protocol part is copied and stored in the DCE sending buffer 170.

First N bytes of the user data having total M bytes, i.e. from 0 to N−1 byte, are used for initiating the random number generator 130. And then, the first N bytes of the user data are encrypted by exclusive OR(XOR) operation with an encryption key in the first logical operation unit 150 and stored in the DCE sending buffer 170, in which the encryption key stored in the encryption key unit 140, is N byte long. The first N bytes of the user data become a seed value of the random number generator 130.

And then, remaining part of the user data, i.e. from N to M−1 byte, is encrypted by XOR operation with the random numbers outputted from the random number generator 130 in the second logical operation unit 160 and stored in the DCE sending buffer 170. The encrypted data frame or data packet stored in the DCE sending buffer 170 is coupled with the protocol unit and then sent to the DCE sending terminal 180.

The first logical operation unit 150 and the second logical operation unit 160 have a plurality of logical operation units connected in parallel. For example, 1 bit-XOR elements are coupled in parallel, in case that the first logical operation unit 150 is 8 bit-XOR element.

Next the decrypting process of the decrypting unit 200 is described.

The data frame or the data packet received from the DCE receiving terminal 210 is stored in the DCE receiving buffer 220. When storing the data frame or the data packet, a tag field which discriminates a protocol part and the user data from the data frame or the data packet, is generated and stored at the same time. And the protocol part is copied and stored in the DTE sending buffer 270.

First N bytes of the user data are decrypted by XOR operation with an N byte-decrypting key stored in the decrypting key unit 230. The XOR operation is carried out by the first logical operation unit 240. And the first N bytes of the decrypted user data are used for initiating the random number generator 250 and stored in the DTE sending buffer 270. The first N bytes of the decrypted user data become a seed value of the random number generator 250.

And then, remaining byte of the user data, i.e. from N to M−1 byte, is decrypted by XOR operation with the random numbers outputted from the random number generator 250 in the second logical operation unit 260 and stored in the DTE sending buffer 270. The decrypted data frame or the packet stored in the DTE sending buffer 270 is coupled with the protocol unit and then sent to the DTE sending terminal 280.

As explained in the encryption unit 100, the first logical operation unit 240 and the second logical operation unit 260 have a plurality of logical operation units connected in parallel. For example, 1 bit-XOR elements are coupled in parallel, in case that the first logical operation unit 240 is 8 bit-XOR element.

Network encryption system according to the present invention initiates the random number generator by using the first N byte of the user data. Therefore, each of the data frame or the data packet is encrypted or decrypted in different ways, therefore having better security level.

Additionally, the improved network encryption system may be substituted with the conventional system using the block encryption algorithm with lower security level. And also, various algorithm may be applied to the encryption apparatus by manufacturing random number generator on demand. And it is capable of establishing higher security level because the random number generator is composed by a plurality of logic elements.

The present invention is not limited to the specifically disclosed embodiments, and variations and modifications may be made without departing from the scope of the present invention.

What is claimed is:

1. Network encryption apparatus comprising:
    encrypting means for generating a random number using a portion of user data discriminated from a sequence of data and for encrypting the user data by logical operation using the random number; and
    decrypting means for generating a random number using a decrypted portion of the user data and for decrypting the user data by logical operation using the random number.

2. Network encryption apparatus as claimed in claim 1, wherein the encrypting means further comprises:
    a Data Terminal Equipment (DTE) receiving buffer for discriminating protocol data and the user data from the data sequence respectively and dividing out the user data;
    an encrypting key unit for storing an encrypting key having a fixed length;
    a random number generating unit for generating the random number using the portion of the user data as a seed value;
    a logical operation unit for encrypting, by logical operation, the portion of the user data with the encrypting key, and a remaining portion of the user data with the random number; and
    a Data Circuit terminating Equipment (DCE) sending buffer for generating a data frame or data packet by coupling the protocol data with the encrypted user data.

3. Network encryption apparatus as claimed in claim 2, wherein the logical operation unit comprises:
    a first logical operation unit for encrypting the portion of the user data by logical operation with the encrypting key; and
    a second logical operation unit for encrypting the remaining portion of the user data by logical operation with the random number.

4. Network encryption apparatus as claimed in claim 3, wherein the logical operation unit has a plurality of logical operation elements connected in parallel.

5. Network encryption apparatus as claimed in claim 2, wherein the random number generating unit is initialized by a portion of the user data in order to generate a different random number for each of a plurality of data frames or data packets.

6. Network encryption apparatus as claimed in claim 1, wherein the decrypting means comprises:
    a DCE receiving buffer for discriminating protocol data and the user data from the data sequence and dividing out the user data;
    a decrypting key unit for storing a decrypting key having a fixed length;
    a first logical operation unit for decrypting a portion of the user data by logical operation with the decrypting key;
    a random number generating unit for generating the random number using the decrypted portion of the user data;
    a second logical operation unit for decrypting the remaining portion of the user data by logical operation with the random number; and
    a DTE sending buffer for generating a data frame or data packet by coupling the protocol data with the decrypted user data.

7. Network encryption apparatus as claimed in claim 6, wherein the random number generating unit is initialized using the portion of the user data decrypted by the first logical operation unit.

8. Network encryption apparatus as claimed in claim 6, wherein the random number generating unit is initialized by the portion of the user data in order to generate a different random number for each of a plurality of data frames or data packets.

9. Network encryption apparatus as claimed in claim 6, wherein the logical operation unit has a plurality of logical operation elements connected in parallel.

10. Network encryption apparatus, comprising:

encrypting means for generating a random number for each of a plurality of data sequences using a first portion of user data from the corresponding one of each data sequence, and for encrypting a second portion of user data in each of the plurality of data sequences by logical operation using the corresponding random number, and for encrypting the first portion of user data in each data sequence with an encrypting key having a fixed length; and decrypting means for decrypting a first portion of user data from each of a plurality of encrypted data sequences by logical operation with a decrypting key having a fixed length, and for generating a random number for each of the plurality of encrypted data sequences using the corresponding, decrypted first portion of user data, and for decrypting a second portion of user data from each of the plurality of encrypted data sequences by logical operation using the corresponding random number.

11. Network encryption apparatus as claimed in claim 10, wherein the encrypting means comprises:

a Data Terminal Equipment (DTE) receiving buffer for discriminating protocol data and the user data from a data sequence and dividing out the user data;

an encrypting key unit for storing an encrypting key having a fixed length;

a random number generating unit for generating a random number using the first portion of the user data in the data sequence;

a first logical operation unit for encrypting the first portion of the user data by logical operation with the encrypting key;

a second logical operation unit for encrypting the second portion of the user data in the data sequence by logical operation with the random number; and a DCE sending buffer for generating a data frame or data packet by coupling the protocol data with the encrypted user data.

12. Network encryption apparatus as claimed in claim 10, wherein the decrypting means comprises:

a DCE receiving buffer for discriminating protocol data and encrypted user data from a data sequence and dividing out the encrypted user data;

a decrypting key unit for storing a decrypting key having a fixed length;

a first logical operation unit for decrypting a first portion of the encrypted user data by logical operation with the decrypting key;

a random number generating unit for generating a random number using the decrypted first portion of the user data;

a second logical operation unit for decrypting a second portion of the encrypted user data by logical operation with the random number; and a DTE sending buffer for generating a data frame or data packet by coupling the protocol data with the decrypted user data.

13. Network encryption method comprising:

an encryption process including the steps of generating a random number using a first portion of user data in a data sequence and encrypting a second portion of the user data by logical operation using the random number; and a decryption process including the steps of generating the random number using a decrypted first portion of the user data and decrypting a second portion of the encrypted user data by logical operation using the random number.

14. Network encryption method as claimed in claim 13, wherein the encryption process further comprises the steps of:

storing an encrypting key having a fixed length;

discriminating protocol data and the user data from the data sequence and dividing out the user data;

generating the random number using the first portion of the user data as a seed value;

encrypting the first portion of the user data by logical operation with the encrypting key;

encrypting the second portion of the user data by logical operation with the random number; and generating a data frame or data packet by coupling the protocol data with the encrypted user data.

15. Network encryption method as claimed in claim 14, wherein the step of generating the random number comprises the step of:

initializing a random number generator using the seed value, wherein a different random number is generated for each of a plurality of subsequent data sequences.

16. Network encryption method as claimed in claim 13, wherein the decryption process further comprises the steps of:

storing a decrypting key having a fixed length;

discriminating protocol data and the encrypted user data and dividing out the user data;

decrypting the first portion of the encrypted user data by logical operation with the decrypting key;

generating the random number using the decrypted first portion of the user data;

decrypting the second portion of the encrypted user data by logical operation with the random number; and generating a data frame or data packet by coupling the protocol data with the decrypted user data.

17. Network encryption method as claimed in claim 16, wherein the step of generating the random number comprises the step of:

initializing a random number generating unit using the decrypted first portion of the user data as a seed value, wherein a different random number is generated for each of a plurality of subsequent, encrypted data sequences in order to encrypt or decrypt data at every input data frame or data packet in different ways.

18. Network encryption apparatus as claimed in claim 17, wherein in the logical operation step, the logical operation operates the user data in a fixed length in parallel.

19. Network encryption apparatus as claimed in claim 16, wherein the steps of decrypting the first and second portions of the encrypted user data involve fixed length, parallel logical operations.

20. A method for encrypting user data comprising the steps of:

generating a random number using a first portion of the user data;

encrypting the first portion of the user data using an encryption key; and encrypting a second portion of the user data using the random number.

21. The method of claim 20 further comprising the step of:

appending a protocol data portion to the first encrypted user data portion and the second encrypted user data portion, thereby generating a data packet.

22. The method of claim 20 further comprising the steps of:

generating a different random number for each of a plurality of data sequences, wherein the random number associated with each of the plurality of data sequences is generated using a first user data portion from the corresponding data sequence.

23. A method for decrypting user data comprising the steps of:

discriminating a first encrypted portion of user data from an encrypted data sequence;

decrypting the first encrypted portion of user data using an encryption key;

generating a random number using the decrypted first portion of the user data; and decrypting a second portion of the encrypted data sequence using the random number.

24. The method of claim 23 further comprising the steps of:

discriminating a first encrypted portion of user data associated with each of a plurality of data sequences;

decrypting the first encrypted portion of user data associated with each of the plurality of data sequences using a decryption key;

generating a random number for each of the plurality of encrypted data sequences using the decrypted first portion of user data associated with the corresponding data sequence, wherein each random number is different as a result of it being generated by a corresponding first portion of decrypted user data; and decrypting a second encrypted portion of user data associated with each of the plurality of data sequences using the corresponding random number.

* * * * *